(12) United States Patent
Chaverot et al.

(10) Patent No.: US 7,931,744 B2
(45) Date of Patent: Apr. 26, 2011

(54) BITUMINOUS MASTIC COMPRISING ULTRAFILLERS AND APPLICATIONS THEREOF

(75) Inventors: Pierre Chaverot, Sainte-Croix En Jarez (FR); Gilles Gauthier, Lyon (FR); Herve Di Benedetto, Lyon (FR); Brice Delaporte, Lyon (FR)

(73) Assignee: Total France, Puteaux (FR)

( * ) Notice: Subject to any disclaimer, the term of this patent is extended or adjusted under 35 U.S.C. 154(b) by 239 days.

(21) Appl. No.: 12/161,097

(22) PCT Filed: Feb. 13, 2007

(86) PCT No.: PCT/EP2007/051379
§ 371 (c)(1),
(2), (4) Date: Oct. 30, 2008

(87) PCT Pub. No.: WO2007/093586
PCT Pub. Date: Aug. 23, 2007

(65) Prior Publication Data
US 2010/0154674 A1 Jun. 24, 2010

(30) Foreign Application Priority Data

Feb. 20, 2006 (FR) ..................................... 06 50516
Aug. 2, 2006 (FR) ..................................... 06 07080

(51) Int. Cl.
*C08L 95/00* (2006.01)

(52) U.S. Cl. ......... 106/284.01; 106/284.02; 106/284.03; 106/284.04

(58) Field of Classification Search ............. 106/284.01, 106/284.02, 284.03, 284.04
See application file for complete search history.

(56) References Cited

U.S. PATENT DOCUMENTS

| | | | |
|---|---|---|---|
| 2,281,505 A | | 4/1942 | Kirkland |
| 4,168,178 A | * | 9/1979 | Hesseler .................. 106/284.05 |
| 5,565,239 A | * | 10/1996 | Pike .............................. 427/186 |
| 6,695,902 B2 | * | 2/2004 | Hemmings et al. ...... 106/284.05 |
| 2002/0124775 A1 | | 9/2002 | Hemmings |
| 2007/0261337 A1 | * | 11/2007 | Whitaker et al. ................ 52/300 |
| 2009/0030118 A1 | * | 1/2009 | Lapalu et al. .................... 524/68 |

FOREIGN PATENT DOCUMENTS

| | | |
|---|---|---|
| GB | 502 636 A | 3/1939 |
| GB | 994 579 A | 6/1965 |
| GB | 1 034 361 A | 6/1966 |
| GB | 1 127 847 A | 9/1968 |
| GB | 2 339 432 A | 1/2000 |

* cited by examiner

*Primary Examiner* — Helene Klemanski
(74) *Attorney, Agent, or Firm* — Pearne & Gordon LLP

(57) ABSTRACT

The present invention relates to a bituminous mastic, in other words a mixture comprising on the one hand at least one bitumen-based hydrocarbon binder, More particularly a blown bitumen, and on the other hand fines, including an ultrafines fraction. The invention also relates to poured asphalts and bituminous coatings comprising a bituminous mastic. A method of producing such bituminuous materials is described, as are the road-building and industrial applications of these materials.

18 Claims, No Drawings

BITUMINOUS MASTIC COMPRISING ULTRAFILLERS AND APPLICATIONS THEREOF

The present invention relates to a bituminous mastic, i.e. a mixture comprising, on the one hand, at least one bitumen-based hydrocarbon-containing binder, and on the other hand fillers, a part of which is ultrafillers. The invention also relates to a bituminous material comprising a bituminous mastic, as well as a method for the preparation of a bituminous composition—mastic or material—and the use of ultrafillers.

Bituminous mixes comprise a mixture of aggregates of different sizes and hydrocarbon-containing binders from various origins, natural or resulting from a processing of crude oil. A controlled quantity of air voids, or porosity, is provided in the structure in order to develop the required mechanical qualities. The applications of bituminous mixes are essentially those for the construction and maintenance of roadways and car parks.

A substantially different product family, cast asphalts, also comprises a mixture of aggregates and hydrocarbon-containing binders. However, cast asphalts have no porosity. The porosity is defined by the spaces existing within the composition, said spaces being occupied by air, not by mineral material or hydrocarbon-containing binder. These spaces occupied by air are called "air voids". Cast asphalts are applied essentially for waterproofing buildings and works, as well as sidewalks in an urban environment.

In these materials—bituminous mixes or cast asphalts—essentially aggregates are found ranging in size between a maximum of 20 millimetres to 30 millimetres and a minimum of approximately a tenth of a millimetre. Moreover, these materials generally contain fine mineral materials, commonly known as fillers, of a diameter less than or equal to 100 µm and, for the finest, of the order of 10 to 20 µm. These fillers originate either from the abrasion of aggregates during their handling in the course of processing and transport, or from procedures specifically dedicated to crushing and grinding soft aggregates.

The differences in porosity between bituminous mixes and cast asphalts derive from the grain size distribution of the mineral elements and the binder content. In practice, cast asphalts generally contain aggregates having a diameter less than or equal to 10 mm. Cast asphalts can therefore be described as a continuous phase based on a bituminous hydrocarbon-containing binder in which the aggregates are dispersed. Bituminous mixes contain in addition, aggregates having a diameter greater than 10 mm and have a certain porosity.

The mixture of mineral fillers and bituminous hydrocarbon-containing binder, also known under the name of bituminous mastic, represents an important key element determining the characteristics of the mixes and cast asphalts. In fact, due to their low grain size with respect to the remainder of the aggregates of the mix, fillers represent the greater part of the effective specific surface area of a mix or a mastic asphalt. The quality of the interface between the hydrocarbon-containing binder and the fillers is responsible in part for the good resistance of the mix or the mastic asphalt with regard to attacks such as permanent deformation (rutting and/or indentation), cracking due to fatigue or sudden changes of temperature, resistance to stripping and resistance to ageing.

Due to this specific surface area, it is also at this level that the maximum interactions take place between the weakly polar medium represented by the bituminous binder and the strongly polar one represented by the mineral aggregate.

There is a constant need for improvement in the performance of bituminous materials for roadway or industrial use. One problem that the inventors aimed to solve consists of improving and modifying the quality of the interface between the hydrocarbon-containing binder and the fillers, in order to improve the mechanical performances of the bituminous materials, in particular against attacks such as permanent deformation (rutting and/or indentation), cracking due to fatigue or sudden changes of temperature, resistance to stripping or resistance to ageing.

Thus, the present invention aims to propose new bituminous materials.

Another aim of the invention is to propose bituminous materials, the mechanical performances of which are improved, in particular the modulus of rigidity. This improvement in performances is carried out whilst maintaining the usual properties sought in the materials prepared, in particular at a low temperature.

Another aim of the invention is to propose a route for increasing the modulus of rigidity of bituminous materials without the need for changing the nature and the hardness grade of the bitumen used. Thus, the increase in the modulus of rigidity is accompanied by maintaining resistance to the cracking which can appear at a low temperature of use (thermal shrinkage).

Another aim of the invention is to propose a ready-for-use product, which can be used as such, and for the preparation of bituminous materials.

An aim of the invention is also to propose a method for the preparation of such bituminous materials or products.

An aim of the invention is also to propose the use of such bituminous materials or products for roadway applications and for industrial applications.

Other aims and advantages of the present invention will become apparent from the following description.

Firstly, the present invention relates to a bituminous mastic which comprises, on the one hand, at least one bitumen-based hydrocarbon-containing binder, and on the other hand fillers, at least one part of which is constituted by ultrafillers having a diameter of less than 1.0 µm. The bituminous mastic is useful as such or as an intermediate in the preparation of various bituminous materials, in particular cast asphalts and bituminous mixes.

Therefore secondly, the invention relates to a bituminous material—for example, mastic asphalt or bituminous mix—comprising such a mastic and aggregates, the majority of which, preferably the entirety, has a diameter greater than 100 µm.

The invention relates moreover to various methods for the preparation of a bituminous material according to the procedures detailed hereafter.

The use of ultrafillers in the preparation of a reinforced bituminous material is also envisaged.

Another aspect of the invention relates to elements constituted by at least one surfacing comprising a mastic according to the invention. These elements can be very varied; for example, one of the layers constituting the structure of the roadway or one of the layers of a waterproof mix can be mentioned.

Among the bitumen-based hydrocarbon-containing binders, in particular those which are anhydrous or in the form of emulsions, can be mentioned in particular those comprising pure bitumens, fluidified bitumens, fluxed bitumens and oxidized bitumens as well as mixtures of these bitumens.

Bitumen is a heavy product which can originate from various sources. It can in particular originate from the most viscous fraction produced during direct distillation of crude oil.

It can also be obtained from different refining effluents such as the products of de-asphalting, visbreaking residues, the products of blowing and/or natural asphalt, optionally combining them together and/or with the above distillation residues.

Blown bitumens or oxidized bitumens are a particular family of bituminous bases available at the refinery, which are used because of their properties for the preparation of commercial products. Blown bitumens are manufactured in a blowing unit, by passing a flow of air through a starting bituminous base. This operation can be carried out in the presence of an oxidation catalyst, for example phosphoric acid. Generally, the blowing is carried out at high temperatures, of the order of 200 to 300° C., for relatively long periods of time typically comprised between 30 minutes and 2 hours, continuously or in batches. The blowing period and temperature are set according to the properties intended for the blown bitumen and according to the quality of the starting bitumen.

The principal aim of blowing a bitumen is to reduce its thermal susceptibility, i.e. to increase the penetration index (or Pfeiffer index) of the blown bitumen compared with the starting bitumen (most frequently a direct distillation bitumen). The blowing operation has the effect of hardening the treated bitumen by oxidation in relation to the bitumen from which it originated. A blown bitumen has a higher ring-and-ball softening point (RBSP) than that of a bitumen of the same needle penetration at 25° C. Thus, the Pfeiffer index of a blown bitumen, of the order of +1 to +2 with respect to the severity of the oxidation treatment, is very largely greater than that of the direct distillation starting bitumen, generally of the order of −1.

According to a particular embodiment of the invention, the hydrocarbon-containing binder included in the bituminous mastic comprises oxidized bitumen, preferably at least 20% by volume of oxidized bitumen, and even better, at least 50% by volume of oxidized bitumen. According to another particular embodiment of the invention, the hydrocarbon-containing binder comprises essentially oxidized bitumen.

It is moreover known to modify the bituminous binder by mixing with bitumen, alone or originating from a mixture of bitumens, at least one compound being of the (co)polymer type, with a view to improving some of the mechanical and thermal performances thereof.

Pure bitumens and polymer bitumens are used both in the field of roadway applications (for example, roadway construction and maintenance) and in the field of industrial applications (for example, waterproofing roofs and dykes, carpet tiles).

By way of examples of polymers for bitumen, there can be mentioned elastomers such as the copolymers SB, SBS, SIS, SBS*, SBR, EPDM, polychloroprene, polynorbonene and optionally polyolefins such as polyethylenes PE, PEHD, polypropylene PP, plastomers such as EVA, EMA, copolymers of olefins and unsaturated carboxylic esters EBA, elastomeric polyolefin copolymers, polyolefins of the polybutene type, copolymers of ethylene and acrylic, methacrylic acid esters or maleic anhydride, copolymers and terpolymers of ethylene and glycidyl methacrylate, ethylene-propylene copolymers, rubbers, polyisobutylenes, SEBS, ABS.

| SB | styrene-butadiene block copolymer |
| SBS | styrene-butadiene-styrene block copolymer |
| SBS* | star styrene-butadiene-styrene block copolymer |
| EVA | polyethylene-vinyl acetate copolymer |
| EBA | polyethylene-butyl acrylate copolymer |
| PE | polyethylene |
| EPDM | modified ethylene propylene diene |
| SIS | styrene-isoprene-styrene |
| EMA | polyethylene-methyl acrylate copolymer |
| SEBS | styrene, ethylene, butylene, styrene copolymer |
| ABS | acrylonitrile-butadiene-styrene |
| HDPE | high density polyethylene |
| SBR | styrene-b-butadiene-rubber |

Other additives can be added to the bitumen base according to the invention. These are for example vulcanization agents and/or cross-linking agents capable of reacting with a polymer, when an elastomer and/or a plastomer, which can be functionalized and/or can comprise reactive sites, is involved.

Among the vulcanization agents there can be mentioned those which are based on sulphur and its derivatives, used to cross-link an elastomer at the rate of 0.01% to 30% relative to the weight of elastomer.

Among the cross-linking agents there can be mentioned cationic cross-linking agents such as mono- or polyacids, or carboxylic anhydrides, carboxylic acid esters, sulphonic, sulphuric, phosphoric acids, even acid chlorides, phenols, at rates of 0.01% to 30% relative to the polymer. These agents are capable of reacting with the elastomer and/or the functionalized plastomer. They can be used to complement or replace vulcanization agents.

Among the additives capable of being used in the mastic or the hydrocarbon-containing binder containing the mastic according to the invention, there can be mentioned as non-limitative examples:

carboxylic acids such as 4,4'dicarboxydiphenylether, sebacic acids, anhydrides such as phthalic, oxydiphthalic, trimellitic, terephthalic butyl esters—phthalic or oxydiphthalic acid anhydrides, sulphonic acids such as para-toluene sulphonic, sulphonic or disulphonic naphthalene, methane sulphonic, 1-hexane sulphonic acids, phosphonic acids such as benzene phosphonic, tert-butyl phosphonic acids, phosphoric acids such as phosphoric, polyphosphoric and alkylphosphoric acids such as dodecylphosphoric or also diethylphosphoric or also glycerophosphoric acid, or even arylphosphoric acids such as phenylphosphoric acid.

2',3-bis[[3-[3,5-di-tert-butyl-4-hydroxyphenyl]propionyl]]propionohydrazide.

In terms of the present invention, a distinction is made between aggregates and fillers. The term "filler" designates mineral elements, the diameter of which is less than or equal to 100 µm. Among the fillers, ultrafillers are distinguished, the diameter of which is less than or equal to 1.0 µm. The methods for determining the diameter of the fillers and ultrafillers are known to a person skilled in the art. These involve, for example, laser diffraction granulometry methods. In these granulometric methods, a coherent light (the laser) is diffracted by the discrete particles that constitute the fillers and the ultrafillers [NF ISO 13320-1 (September 2000 version)].

The term "aggregate" designates elements, in particular mineral elements, the diameter of which is greater than 100 µm. In the applications concerned, aggregates generally have a characteristic dimension less than or equal to 30 mm without this indication being restrictive. The diameter of the aggregates can be determined for example by sieving.

The term "mineral material" encompasses aggregates, fillers and ultrafillers.

In a variant of the invention, the bituminous mastic comprises on the one hand, at least one bitumen-based hydrocarbon-containing binder, and on the other hand, fillers of which at least 5% by mass are ultrafillers. Here the ratio $R_{UF}=m_{UF}/m_F$, is considered, where $m_{UF}$ is the mass of ultrafillers and $m_F$ is the mass of fillers (therefore including the ultrafillers). Preferably, $R_{UF}$ is greater than or equal to 30%, even greater than or equal to 40% by mass. Preferentially, the bituminous mastic comprises a majority of ultrafillers (i.e. at least 50% by mass of fillers, and even better, at least 75% by mass of ultrafillers, or at least 90% by mass of ultrafillers), even exclusively ultrafillers (100% by mass of fillers).

According to another variant of the invention, the ratio $R_{UF}$ is greater than or equal to 15% by mass, even greater than or equal to 20% by mass.

Below 5% ultrafillers with respect to the mass of fillers, the effect of the addition of ultrafillers has no discernable effect on the properties of the bituminous mastic or of the material comprising such bituminous mastic. A person skilled in the art can adjust the quantity of ultrafillers incorporated into the mastic, depending on the performances envisaged, by carrying out the usual tests, such as those described in the literature. In particular, the tests described in the following standards can be mentioned: NFP 98250-1 (manufacture of mixes), NFP 98252 (giratory shear compactor), NFP 98251-1 (Duriez compression), NFP 98250-2 (plate compaction), NF EN 12697.

Advantageously, a significant part of the ultrafillers has a diameter less than or equal to 0.5 μm, even better, less than or equal to 0.3 μm. According to the present invention, it is considered that a part is significant when it represents at least 10% of the total, preferably at least 25% (¼) of the total and even better, at least 33% (⅓) of the total. According to a particular embodiment of the invention, the average diameter by volume of the ultrafillers varies from 0.12 to 0.25 μm.

In any case, it is preferable that the fillers, including the ultrafillers, represent from 30 to 70% by volume with respect to the total volume of bituminous mastic. The ratio $R_{FM}=v_F/(v_F+v_{LB})$, where $v_F$ is the volume of fillers (therefore including the ultrafillers) and $v_{LB}$ is the volume of bituminous hydrocarbon-containing binder, is considered here. It can be noted that the sum of $v_F$ and $v_{LB}$ represents the total volume of mastic.

Preferably, the ultrafillers, and the fillers when present, are of mineral type. Suitable minerals for ultrafillers and fillers are preferentially selected from: fumed silicas, coloidal silicas, in particular combustion silicas and precipitation silicas, clays such as for example phyllosilicates such as bentonites, actapulgite, chlorites, kaolins, talc, chalk, metal oxides such as aluminium, rutile or anatase, zinc oxides, metal hydroxides such as alumina or iron hydroxide, metal nitrides such as boron nitride, and mixtures thereof. Minerals suitable for ultrafillers and fillers can have been processed to make their surface more or less hydrophobic.

As will be illustrated in the example embodiments of the invention, the incorporation of ultrafillers into the bituminous mastic makes it possible to improve the modulus of rigidity in dynamic shear, G*. For example, the composition of the mastic based on pure bitumen 50/70 can be adjusted in order to obtain the following G* values at a reference temperature of 10° C.:

$G^* \geq 10^4$ Pa at an equivalent strain rate frequency of $10^{-5}$ Hz,
and/or $G^* \geq 10^6$ Pa at an equivalent strain rate frequency of $10^{-3}$ Hz.

According to another aspect, the present invention relates to a bituminous material comprising at least one bituminous mastic as described above, and aggregates.

As previously stated, the aggregates have a diameter greater than 0.1 mm (or 100 μm). Depending on the maximum dimensions of the aggregates, it is possible to distinguish on the one hand, cast asphalts, and on the other hand, bituminous mixes. Cast asphalts form part of the bituminous materials considered according to the invention.

Preferably, the diameter of the aggregates in a mastic asphalt is less than or equal to 10 mm. Generally, such materials are not porous.

Also considered among the bituminous materials are bituminous mixes which, apart from aggregates of a diameter less than or equal to 10 mm, fillers and ultrafillers, also comprise aggregates of diameter greater than 10 mm and generally less than or equal to 30 mm, although this value does not constitute an absolute limit. Bituminous mixes are essentially distinguished from cast asphalts in that they have a porosity.

The porosity is defined as follows: it is the space not occupied by the mineral materials or the bituminous materials within the mix. This variable develops during compacting of the mixture, an operation which consists of having a heavy vehicle equipped with specially designed metal wheels pass over the hot mix. The compactness is measured in various ways. For example, mention can be made of the method which consists of calculating the ratio between the so-called "apparent" density of a specimen of the mix and the so-called "theoretical" density of the same specimen. The apparent density is obtained by calculating the ratio of the mass of the specimen to its volume determined by its external dimensions; the theoretical density is obtained by the sum of the densities of its different constituents.

Many types of aggregates can be envisaged. They are preferentially selected from mineral aggregates, for example roadway aggregates satisfying the relevant standards: NF EN 13043 "Aggregates for bituminous mixtures and surface treatments for roads, airfields and other trafficked areas" in Europe, ASTM C33 "Standard specification for concrete aggregates" in USA.

Various qualities of aggregate are distinguished, for example depending on grain size, acidity in the petrographical sense, i.e. their silica content, or also the presence or absence of a vitreous phase. Various types of aggregates can be envisaged, in particular natural and/or synthetic aggregates (foundry slag, alumina).

The fillers and ultrafillers can originate from attrition processes existing during transport, storage and/or processing of the aggregates. For this reason, the fillers and ultrafillers can have an identical chemical composition to that of the aggregates.

Preparation of bituminous materials according to the invention is carried out according to the methods and using equipment known to a person skilled in the art. The principal difference resides in the fact that ultrafillers are incorporated into the usual components of a bituminous material. This makes it possible to give specific, particularly mechanical, characteristics to the bituminous material thus prepared.

The mastic obtained by mixing the bitumen-based hydrocarbon-containing binder and the ultrafillers comprises at least 5% ultrafillers and preferably 30% ultrafillers with respect to the total mass of fillers.

This said, it is useful to detail several methods of preparation which can be envisaged. For the preparation of a bituminous mastic, it is preferable to bring the bitumen-based hydrocarbon-containing binder to a predetermined temperature, before mixing with it the ultrafillers and optionally the fillers. Then aggregates, the diameter of which is greater than 100 µm, can be mixed with the bituminous mastic thus obtained, in order to obtain a bituminous material such as a mastic asphalt or a bituminous mix.

In order to prepare a bituminous material, it is also possible to mix simultaneously with the bitumen-based hydrocarbon-containing binder: (i) ultrafillers the diameter of which is less than 1.0 µm, (ii) optionally fillers the diameter of which is less than 100 µm, and (iii) optionally aggregates the diameter of which is greater than 100 µm.

Advantageously, the bitumen-based hydrocarbon-containing binder is previously brought to a predetermined temperature, in order to facilitate mixing with the ultrafillers, and the fillers and/or aggregates if these are present.

It can also be envisaged, in order to obtain a bituminous mastic according to the invention, to bring it to a predetermined temperature, then mix with it, aggregates of diameter greater than 100 µm and optionally a complement of fillers and/or ultrafillers with respect to those already present in the bituminous mastic.

Optionally, it is possible to mix at least one bitumen-based hydrocarbon-containing binder with the bituminous mastic, before, simultaneously, or after the optional incorporation of aggregates, fillers and ultrafillers. In this case, it is useful to bring the bituminous mastic and the hydrocarbon-containing binder to a predetermined temperature, for example the same temperature, before mixing them together.

The conditions for the preparation of the bituminous material are known to a person skilled in the art, in particular the temperature of the binders, the speed of mixing, the type of mixer.

For example, for preparing a bituminous membrane, the mineral (aggregates, fillers and ultrafillers) and bituminous materials, modified or unmodified with polymers, are prepared in a mixer at a temperature comprised between 150° C. and 250° C. Then the mixture is transferred whilst still molten to the forming area, where it is spread uniformly on a support (woven cloth or fibrous support for example). After cooling down, the coated support is packed, for example in cut sheets or in the form of rolls.

In order to prepare a mastic asphalt, the mineral and bituminous materials, modified or unmodified with the polymers, are prepared in a mixer at a temperature comprised between 200° C. and 260° C. The mixture is transported to the laying site in tanker lorries equipped with stirring. The mixture is laid either manually by transfer in buckets and spreading by float, or mechanically by transfer using a special pump to a machine which lays a standard asphalt layer of controlled thickness.

In order to prepare a bituminous mix, the mineral and bituminous materials (in the form of an emulsion or hot in molten form), modified or unmodified with polymers, are prepared either continuously in a drum mixer or discontinuously in a batch mixer. Then the mixture is transferred to the laying site in lorries, optionally tarpaulin-covered lorry. The final laying is carried out with a finisher which lays a layer of mix, of controlled thickness. The layer is then compacted before cooling down.

According to another aspect of the invention, the latter relates to the use of ultrafillers in the preparation of a reinforced bituminous material: bituminous membrane, mastic asphalt or bituminous mix. The diameter of the ultrafillers is preferably less than or equal to 1.0 µm, even better less than or equal to 0.5 µm. The characteristics of the ultrafillers have been described above.

For example, the use of ultrafillers in the preparation of a bituminous road surfacing of a cast asphalt or a bituminous membrane is a subject of the invention, as well as the use of a bituminous mastic containing ultrafillers for the preparation of bituminous materials intended for the preparation and maintenance of road sufacings, the preparation of cast asphalts and/or the preparation of a bituminous membrane.

Another aspect of the invention relates to the different industrial and roadway products which comprise a bituminous material or a bituminous mastic defined above. Quite particularly, the invention relates to elements constituted by at least one surfacing comprising a mastic according to the invention. These elements can be very varied. There can be mentioned for example, one of the layers constituting the structure of a roadway, one of the layers of a waterproof mix, or also, one of the impregnation layers for carpet tiles.

In order to illustrate the different types of elements with a stratified structure, there can be mentioned:

for roadway applications, bituminous mixes in particular are considered as materials for the construction and maintenance of road foundations and their surfacing, as well as for carrying out all road works. Thus, the invention relates for example to surface dressings, hot asphalt mixes, cold asphalt mixes, cold-cast asphalt mixes, gravel emulsions, base, binder, bonding and wearing courses, and other combinations of a bituminous binder and road aggregate having particular properties, such as anti-rutting courses, draining mixes, or asphalts (a mixture of a bituminous binder and aggregates of the sand type).

referring to the industrial applications of the bitumen mastics according to the invention, there can be mentioned the manufacture of sealing membranes, anti-noise membranes, insulating membranes, surface coatings, carpet tiles, impregnation courses, etc.

Also concerned are elements having a stratified structure useful for the manufacture of interior or exterior coverings used for waterproofing and/or damping vibration and/or thermal and/or sound insulation and/or fire protection. Such coverings are used in particular in buildings (exterior/interior), in vehicle bodies, in cooling machinery such as refrigerators, freezers, air-conditioners, etc.

More particularly, regarding industrial applications in the building field, the following are especially concerned:

interior coverings for buildings: floor coverings (carpeting, carpet strips or tiles, interior screeds, flooring in particular floating floors) or wall coverings, and, exterior coverings for buildings: waterproof membranes (or screeds) for roofs, patios, façades, walls etc.

For waterproof membranes, two types are distinguished which are available on the market. The first type comprises waterproof membranes applied by heating (for example: with a naked flame or using resistance heater(s)), in order to soften, even liquefy, the bitumen and thus provide the bond between the membrane and the exterior support (often made of concrete) for roofing, patios and/or façades. The second type of waterproof membranes comprises self-adhesive waterproof membranes, applied by simple pressure onto the exterior supports of buildings (roofing, patios, façades). The bituminous mastics used in these two types of waterproof membranes include bitumen (or bituminous binder) stricto sensu, fillers, the ultrafillers of which satisfy the present invention, and optionally one or more (co)polymers.

In order to prepare these waterproof membranes and/or floor covering elements (carpeting, carpet in tiles or in rolls), the bituminous mastics are applied onto a fibrous or non-fibrous, woven or non-woven support, for example, a mat or net of inorganic fibres such as glass fibres, a net of organic synthetic copolymer fibres such as polyester fibres, or a net comprising a mixture of organic and inorganic fibres. The techniques usually used are the techniques of surface coating and/or impregnation into the mass of the fibrous support, whether woven or not.

EXAMPLES

Part I: Bituminous Mastic

The aim of the following examples is to study the properties of the bituminous mastics or the binders containing them.

The behaviour of said mastics or binders was studied in an annular ring rheometer having a 5 mm gap, making it possible to ignore the interactions between the discrete objects of the material to be studied and the walls of the measurement device.

In addition to tests carried out on mastics or binders containing standard fillers, mastics and binders with ultrafillers were tested.

In Examples 1 to 6, the bitumen used is a pure bitumen having a penetrability of 57 1/10 mm (Standard EN 1426) and a ring and ball temperature (RBT) of 49° C. (Standard EN 1427). In Examples 9 and 10, the bitumen used is an oxidized bitumen having a penetrability of 39 1/10 mm (Standard EN 1426) and an RBT of 63° C. (Standard EN 1427).

The ultrafillers used are characterized by the fact that their grain size ranges between 0 and 0.3 µm. The products used are constituted by fumed silica.

Characterization of the mastics and binders is carried out by measuring the value of the modulus of rigidity as a function of the strain-rate frequency and the temperature applied. The modulus of rigidity in dynamic shear G* is defined as the norm of the ratio between the stress, for example a sinusoidal shear in the form $\tau_0 \cdot e^{i\omega t}$, and the deformation response, for example a distortion, also sinusoidal, in the form $\gamma_0 \cdot e^{i(\omega - \phi)}$.

This measurement is made by placing a specimen of the binder or the mastic to be studied between two concentric cylinders and by imposing an axial sinusoidal deformation on one of the cylinders and by recording the sinusoidal stress transmitted by the binder to the other cylinder (imposed deformation test).

It is possible to represent the results of the modulus tests by the master curve which links the modulus of the material to the equivalent strain-rate frequency. Under the principle of time/temperature equivalence, the temperature is fully taken into account in the strain-rate frequency: a high frequency being equivalent to a low temperature, and a low frequency to a high temperature. For each equivalent frequency, the modulus of the material can therefore be determined.

The methods of measurement and the coaxial cylinder rheometer are precisely described in the article by Delaporte, Di Benedetto, Sauzeat and Chaverot "Linear viscoelastic properties of mastics: results from a new annular shearing rheometer and modelling" [Delaporte B., Di Benedetto H., Sauzeat C, and Chaverot P. Bearing Capacity of Roads, Railways and Airfields (CD-Rom), Trondheim (2005)].

Example 1

Bitumen (Comparative)

A bitumen having a penetrability 57 1/10 mm (EN 1426) is preheated to a temperature comprised between 140 and 150° C. then placed in the above described coaxial cylinder rheometer.

The modulus of the material is measured by varying the temperature and the frequency. The measurement results are placed on the master curve, thus allowing the modulus of the material to be read (TABLE 1).

Example 2

Mastic Based on 20 µm Fillers (Comparative)

A mixture was prepared comprising 60 parts by volume of a bitumen having a penetrability of 57 1/10 mm (EN 1426) heated between 140 and 150° C. and 40 parts by volume of fillers having an average diameter equal to 20 µm, also heated. The mixture is then rapidly placed in the coaxial cylinder rheometer described above.

The modulus of the material is measured by varying the temperature and the frequency. The measurement results are placed on the master curve, thus allowing the modulus of the material to be read (TABLE 1).

Example 3

Mastic Based on 5 µm Fillers (Comparative)

A mixture was prepared comprising 60 parts by volume of a bitumen having a penetrability 57 1/10 mm (EN 1426) heated between 140 and 150° C. and 40 parts by volume of fillers having an average diameter equal to 5 µm, also heated. The mixture is then rapidly placed in the above described coaxial cylinder rheometer. The modulus of the material is measured by varying the temperature and the frequency.

The measurement results are placed on the master curve, thus allowing the modulus of the material to be read (TABLE 1).

Example 4

Mastic According to the Invention Based on 0.2 µm Ultrafillers

A mixture was prepared comprising 60 parts by volume of a bitumen having a penetrability of 57 1/10 mm (EN 1426) heated between 140 and 150° C. and 40 parts by volume ultrafillers having an average diameter equal to 0.2 µm, also heated. The mixture is then rapidly placed in the coaxial cylinder rheometer described above. The ultrafillers comprise fumed silica composed of approximately 90% amorphous silica, 1% crystallized silica, the remainder being composed of metal oxides.

The modulus of the material is measured by varying the temperature and the frequency. The measurement results are placed on the master curve, thus allowing the modulus of the material to be read (TABLE 1).

Example 5

Mastic According to the Invention Based on 0.2 µm Ultrafillers

A mixture was prepared comprising 70 parts by volume of a bitumen having a penetrability 57 1/10 mm (EN 1426) heated between 140 and 150° C. and 30 parts by volume of ultrafines having an average diameter equal to 0.2 µm, also heated. The mixture is then rapidly placed in the coaxial cylinder rheometer described above. The ultrafillers comprise fumed silica composed of approximately 90% amorphous silica, 1% crystallized silica, the remainder being composed of metal oxides.

The modulus of the material is measured by varying the temperature and the frequency. The measurement results are placed on the master curve, thus allowing the modulus of the material to be read (TABLE 1).

Example 6

Mastic According to the Invention Based on 0.2 μm Ultrafillers

A mixture was prepared comprising 60 parts by volume of a bitumen having a penetrability 57 1/10 mm (EN 1426) heated between 140 and 150° C. and 40 parts by volume of a mixture comprising 30% weight of fillers having an average diameter of 20 μm, 30% by weight of fillers having an average diameter 5 μm and 30% by weight ultrafillers having an average diameter equal to 0.2 μm, also heated. The mixture is then rapidly placed in the coaxial cylinder rheometer described above. The modulus of the material is measured by varying the temperature and the frequency.

The measurement results are placed on the master curve thus allowing the modulus of the material to be read (TABLE 1).

Example 9

Oxidized Bitumen (Comparative)

An oxidized bitumen having a penetrability 39 1/10 mm (EN 1426) is preheated to a temperature comprised between 140 and 150° C. then placed in the coaxial cylinder rheometer described above.

The modulus of the material is measured by varying the temperature and the frequency. The measurement results are placed on the master curve, thus allowing the modulus of the material to be read (TABLE 1).

Example 10

Mastic According to the Invention Based on 0.2 μm Ultrafillers

A mixture was prepared comprising 70 parts by volume of an oxidized bitumen having a penetrability 39 1/10 mm (EN 1426) heated between 140 and 150° C. and 30 parts by volume ultrafillers having an average diameter equal to 0.2 μm, also heated. The mixture is then rapidly placed in the coaxial cylinder rheometer described above. The ultrafillers comprise fumed silica composed of approximately 90% amorphous silica, 1% crystallized silica, the remainder being composed of metal oxides.

The modulus of the material is measured by varying the temperature and the frequency. The measurement results are placed on the master curve, thus allowing the modulus of the material to be read (TABLE 1).

Results

In the case where the fillers are constituted by 100% ultrafillers, the modulus of rigidity is multiplied at minimum by a factor close to 10 at the frequency of $10^{-3}$ Hz, and at minimum by a factor close to 30 at the frequency of $10^{-5}$ Hz when the fraction by volume of the fillers is 40%.

In the case where the fillers are constituted by 100% ultrafillers, the modulus of rigidity is multiplied at minimum by a factor close to 7 at the frequency of $10^{-3}$ Hz, and at minimum by a factor close to 3 at the frequency of $10^{-5}$ Hz when the fraction by volume of the fillers is 30%.

Moreover, a minimum increase of the modulus of rigidity is noted, of the order of 25% at a frequency of $10^{-5}$ Hz with 30% by volume ultrafillers with respect to the total of the fillers.

At a frequency $10^{-3}$ Hz, the modulus of rigidity is increased by a minimum of 100% with 30% by volume of ultrafillers with respect to the total of the fillers.

The use of blown bitumen produces very interesting results. In fact, for a given penetrability, use of a blown bitumen in place of a pure bitumen in a mastic comprising 30% by volume of ultrafillers, leads to a very significant increase in the modulus of rigidity of the mastic of the order of ratio 3 (compare Examples 5 and 10).

Furthermore, the theory can be advanced of a synergy between the content of ultrafillers and the use of a blown or oxidized bitumen. In fact, a significant increase in the modulus of rigidity is noted following the replacement of fillers in the bituminous mastic by ultrafillers. Moreover, in a bituminous mastic based on ultrafillers, a significant increase in the modulus of rigidity is noted when oxidized bitumen is used rather than pure bitumen.

It should be noted that an increase of 10% in the modulus of rigidity is regarded as significant for a given mastic. In other words, the mastic applied has an improved resistance to deformation, which has a direct influence on the lifespan of the material and/or on the quantity to be used in order to achieve a utilisation property.

TABLE 1 examples 1 to 6, 9 and 10

| Ex. | Diameter of the fillers | $R_{FM}$ % by volume filler/mastic | $R_{UF}$ % by mass ultrafillers/fillers | Strain-rate frequency | Modulus [1] (kPa) |
|---|---|---|---|---|---|
| 1 | — | 0 | 0 | $10^{-5}$ Hz | $2.0 \times 10^3$ |
| 2 | 20 μm | 40 | 0 | | $1.2 \times 10^4$ |
| 3 | 5 μm | 40 | 0 | | $1.8 \times 10^4$ |
| 4 | 0.2 μm | 40 | 100 | | $3.5 \times 10^5$ |
| 5 | 0.2 μm | 30 | 100 | | $4.7 \times 10^4$ |
| 6 | 0.2 μm | 40 | 30 | | $2.8 \times 10^4$ |
| 9 [2] | — | 0 | 0 | | $1.2 \times 10^4$ |
| 10 [2] | 0.2 μm | 30 | 100 | | $9 \times 10^5$ |
| 1 | — | 0 | 0 | $10^{-3}$ Hz | $1.2 \times 10^5$ |
| 2 | 20 μm | 40 | 0 | | $6.8 \times 10^5$ |
| 3 | 5 μm | 40 | 0 | | $9.1 \times 10^5$ |
| 4 | 0.2 μm | 40 | 100 | | $5.8 \times 10^6$ |
| 5 | 0.2 μm | 30 | 100 | | $1.8 \times 10^6$ |
| 6 | 0.2 μm | 40 | 30 | | $1.4 \times 10^6$ |
| 9 [2] | — | 0 | 0 | | $2.9 \times 10^5$ |
| 10 [2] | 0.2 μm | 30 | 100 | | $8.3 \times 10^6$ |

[1] viscoelastic modulus in dynamic shearing G*
[2] use of an oxidized bitumen

Part 2: Bituminous Mixture

The aim of the following examples is to study the properties of the bituminous mixtures containing, or not containing, ultrafillers.

The behaviour of said mixtures was studied by measuring the dynamic modulus E* under sinusoidal loading conditions of specimens of mixes.

The modulus of rigidity in dynamic traction/compression E* is defined as the norm of the ratio between the stress, for example a sinusoidal traction/compression having the form $T_0 \cdot e^{i\omega t}$, and the deformation response, a sinusoidal traction/compression having the form $\Omega_0 19 \, e^{i(\omega t - \phi)}$.

The method of measurement of the dynamic modulus under axial traction/compression is described precisely in the article by Di Benedetto H., Part M., De La Roche C, Francken L. "Stiffness testing for Bituminous Mixtures Materials and Structures, vol 34 N° 236 (2001)" covered by test standard NF EN 12697-26.

This measurement is carried out by placing a specimen of the prepared mix between two integral jaws of a hydraulic press. An axial sinusoidal deformation is imposed on one of the pistons and the sinusoidal stress transmitted by the mix to the other piston equipped with a device for recording force (imposed deformation test) is recorded.

The sample in the form of a cylindrical specimen is cored from a slab of the mix representative of the prepared material. This slab of mix is produced in the laboratory using a slab compactor according to test standard NF P 98-250-2.

The cylindrical specimen of mix subjected to the dynamic modulus test under sinusoidal loading conditions has a height of 130 mm±2 mm and a diameter of 95 mm±2 mm. The specimen is bonded with a strong non-deformable adhesive onto two metal cap supports which allow it to be fixed onto the hydraulic press. The specimen is maintained at 10° C. for the entirety of the test.

By imposing sinusoidal deformations ranging between $2.10^{-5}$ and $5.10^{-5}$ at the signal peak, corresponding to a variation in the absolute length of the specimen ranging between $2.6.10^{-6}$ and $6.5.10^{-6}$ m of the press piston, the force obtained in the form of a sinusoidal signal is recorded.

The set of these data makes it possible to define the master curve of the mix studied, which links the modulus of the material to the equivalent strain-rate frequency. Under the principle of time/temperature equivalence, the temperature is fully taken into account in the strain-rate frequency: a high frequency being equivalent to a low temperature, and a low frequency to a high temperature.

The modulus used in the examples is the one used professionally; it is obtained for a temperature of 15° C. and a strain-rate frequency of 10 Hz.

Example 7

Reference Mix without Ultrafillers

A mixture is prepared with,
(i) on the one hand 100 parts by weight of mineral composition based on aggregates and fillers from La Noubleau quarry: 35% by weight gravel 6/10 mm, 10% by weight gravel 4/6 mm, 10% by weight gravel 2/4 mm, 40.6% by weight sand 0/2 and 4.4% by weight added filler (grain size: see TABLE 2),
(ii) and on the other hand, 5.7 parts by weight bitumen having a penetrability (Standard EN 1426) classification 35/50.

The aggregates and the bitumen are preheated to a temperature of 165° C.±3° C. then mixed in a vertical shaft mixer until the aggregates are thoroughly mixed with the bitumen (uniform black colour). The mixture is then transferred into a metal mould of dimensions 600×400 mm on a slab compactor making it possible to obtain a final height of the mix of 150 mm.

After a period of maturing for a minimum of 15 days, the cylindrical specimens as described previously are removed in order to determine the modulus.

Tests are carried out at 20, 15, 10 and 0° C. by imposing a strain-rate frequency of 3, 10, 25 and 50 Hz. The value of the modulus at 15° C.-10 Hz is deduced from the master curve thus obtained.

Example 8

Reference Mix According to the Invention

A mix is prepared with,
(i) on the one hand, 100 parts of mineral composition based on aggregates and fillers from La Noubleau: 35% by weight gravel 6/10 mm, 10% by weight gravel 4/6 mm, 10% by weight gravel 2/4 mm, 40.6% by weight sand 0/2 and 4.4% by weight ultrafillers (grain size: see TABLE 2),
(ii) and on the other hand, 5.7 parts bitumen having a penetrability (Standard EN 1426) classification 35/50.

The aggregates and the bitumen are preheated to a temperature of 165° C.±3° C. then mixed in a vertical shaft mixer until the aggregates are thoroughly mixed with the bitumen (uniform black colour).

The mixture is then transferred into a metal mould of dimensions 600×400 mm on a slab compactor making it possible to obtain a final height of the mixture of 150 mm. After a period of maturing for a minimum of 15 days, the cylindrical specimens as described previously are removed in order to determine the modulus.

Tests are carried out at 20, 15, 10 and 0° C. by imposing a strain-rate frequency of 3, 10, 25 and 50 Hz. The value of the modulus at 15° C.-10 Hz is deduced from the master curve thus obtained.

Results

Thus, in replacing by ultrafillers approximately half of the fillers contained in the mix (corresponding to the fillers contributed by the sand and those termed "added", which have been added specifically by particular ultrafillers), a significant increase is observed in the modulus E* of the mixture (see TABLE 2).

As a result, the mix containing fillers has an improved resistance to deformation, which has a direct influence on the lifespan of said material and/or on the quantity of material (thickness) to be used to achieve a given utilisation property (study by deflection of the carriageway under the effect of a reference load).

TABLE 2

Examples 7 to 8

| Grain size curve Sieve dimension (mm) | Without ultra-fillers (ex. 7) Passing (% wt) | With ultra-fillers (ex. 8) Passing (% wt) |
| --- | --- | --- |
| 12.5 | 100 | 100 |
| 10 | 93 | 93 |
| 8 | 80 | 80 |
| 6.3 | 67 | 67 |
| 5 | 61 | 61 |
| 4 | 56 | 56 |
| 3.15 | 51 | 51 |
| 2 | 41 | 41 |
| 1 | 24 | 24 |
| 0.5 | 16 | 16 |
| 0.3015 | 14 | 14 |
| 0.16 | 11 | 11 |
| 0.08 | 8.7 | 8.7 |
| <0.001 [1] | 0 | 4 |
| Bitumen content 35/50 (ppc [2]) | 5.7 | 5.7 |
| Modulus of rigidity E* at 15° C. and 10 HZ (MPa) | 10500 | 13700 |

[1] ultrafillers
[2] ppc: parts percent of aggregates

The invention claimed is:

1. Bituminous mastic comprising, on the one hand, at least one bitumen-based hydrocarbon-containing binder, and on the other hand, fillers of which at least 30% by mass are ultrafillers the diameter of which is less than 1.0 µm.

2. Bituminous mastic according to claim 1, further comprising fillers the diameter of which is less than or equal to 100 µm.

3. Bituminous mastic according to claim 1, in which the ultrafillers are solid mineral materials.

4. Bituminous mastic according to claim 1, in which the ultrafillers represent 100% by mass of the fillers ($R_{UF}$).

5. Bituminous mastic according to claim 1, in which the fillers, including the ultrafillers, represent 30 to 70% by volume with respect to the volume of mastic ($R_{FM}$).

6. Bituminous mastic according to claim 1, in which the diameter of the ultrafillers is less than or equal to 0.5 μm.

7. Bituminous mastic according to claim 1, in which the average diameter of the ultrafillers varies from 0.12 μm to 0.25 μm.

8. Bituminous mastic according to claim 1, in which the ultrafillers, and optionally the fillers present, are mineral materials selected from the group consisting of: fumed silica, coloidal silicas, clays, metal oxides, metal hydroxides, metal nitrides, and mixtures thereof.

9. Bituminous mastic according to claim 1, in which the hydrocarbon-containing binder comprises oxidized bitumen.

10. Bituminous material comprising at least one bituminous mastic according to claim 1, and aggregates the diameter of which is greater than 100 μm.

11. Bituminous material according to claim 10, in which the diameter of the aggregates is less than or equal to 10 mm.

12. Bituminous material according to claim 10, in which the diameter of the aggregates is less than or equal to 30 mm.

13. Method for the preparation of a bituminous material, comprising at least the following steps:
  a) at least one bitumen-based hydrocarbon-containing binder is brought to a predetermined temperature, b) ultrafillers the diameter of which is less than or equal to 1.0 μm, and optionally fillers the diameter of which is less than or equal to 100 μm, are mixed with the hydrocarbon-containing binder so that the ultrafillers represent at least 30% by mass of the fillers, in order to obtain a bituminous mastic,
  c) then, optionally, aggregates the diameter of which is greater than 100 μm are mixed with the bituminous mastic.

14. Method for the preparation of a bituminous material, comprising at least the following steps:
  a) at least one bitumen-based hydrocarbon-containing binder is brought to a predetermined temperature,
  b) simultaneously the following are mixed with the bitumen-based hydrocarbon-containing binder: ultrafillers the diameter of which is less than or equal to 1.0 μm, aggregates the diameter of which is greater than 100 μm and optionally fillers the diameter of which is less than or equal to 100 μm, wherein the ultrafillers represent at least 30% by mass of the fillers, thereby obtaining bituminous materal.

15. Method for the preparation of a bituminous material, comprising at least the following steps:
  a) at least one bituminous mastic according to claim 1 is brought to a predetermined temperature,
  b) optionally, a bitumen-based hydrocarbon-containing binder is mixed with the bituminous mastic, said binder being optionally brought to a predetermined temperature, and,
  c) simultaneously or successively, aggregates the diameter of which is greater than 100 μm, and ultrafines the diameter of which is less than or equal to 1.0 μm, and/or fillers the diameter of which is less than or equal to 100 μm, are mixed with the bituminous mastic,. wherein the ultrafillers represent at least 30% by mass of the fillers, thereby obtaining bituminous material.

16. A method for preparing reinforced bituminous material comprising fillers, comprising utilizing ultrafillers, the diameter of the ultrafillers being less than or equal to 1.0 μm and representing at least 30% by mass of the fillers.

17. A method of preparing a bituminous road surfacing and/or a mastic asphalt and/or a bituminous sealing layer comprising utilizing ultrafillers representing at least 30% by mass of the fillers.

18. Element with a stratified structure, comprising a plurality of layers integral with each other, at least one of said layers comprising a bituminous mastic according to claim 1.

* * * * *

UNITED STATES PATENT AND TRADEMARK OFFICE
CERTIFICATE OF CORRECTION

| | | |
|---|---|---|
| PATENT NO. | : 7,931,744 B2 | |
| APPLICATION NO. | : 12/161097 | |
| DATED | : April 26, 2011 | |
| INVENTOR(S) | : Pierre Chaverot et al. | |

It is certified that error appears in the above-identified patent and that said Letters Patent is hereby corrected as shown below:

At the Title page of the patent, Section (30), "February 20, 2006" should read -- February 13, 2006 --.

Signed and Sealed this
Ninth Day of August, 2011

David J. Kappos
*Director of the United States Patent and Trademark Office*